(12) United States Patent  (10) Patent No.: US 7,769,346 B1
Van Order et al.  (45) Date of Patent: Aug. 3, 2010

(54) WIRELESS ELECTRICAL CONNECTIVITY SYSTEM FOR USE IN A VEHICLE

(75) Inventors: Kim L. Van Order, Hamilton, MI (US);
Eric S. Deuel, Allendale, MI (US);
Lance M. Hilbelink, Jenison, MI (US);
Leif Norland, Holland, MI (US); Scott T. Williams, Holland, MI (US); Donald W. Beery, Hudsonville, MI (US)

(73) Assignee: Johnson Controls Technology Company, Holland, MI (US)

( * ) Notice: Subject to any disclaimer, the term of this patent is extended or adjusted under 35 U.S.C. 154(b) by 169 days.

(21) Appl. No.: 10/977,119

(22) Filed: Oct. 29, 2004

Related U.S. Application Data

(60) Provisional application No. 60/515,993, filed on Oct. 31, 2003.

(51) Int. Cl.
 *H04B 7/00* (2006.01)
(52) U.S. Cl. ............... 455/41.2; 455/41.3; 307/9.1; 307/10; 439/34; 439/297
(58) Field of Classification Search ............... 455/41.2, 455/41.3; 307/9.1, 10; 439/34, 297
See application file for complete search history.

(56) References Cited

U.S. PATENT DOCUMENTS

| | | | |
|---|---|---|---|
| 4,584,487 A * | 4/1986 | Hesse et al. ............... 307/9.1 |
| 5,154,617 A | 10/1992 | Suman et al. |
| 5,305,355 A * | 4/1994 | Go et al. ................... 375/356 |
| 5,661,455 A * | 8/1997 | Van Lente et al. ........... 340/525 |
| 5,691,848 A * | 11/1997 | Van Lente et al. ........... 359/601 |
| 6,396,164 B1 * | 5/2002 | Barnea et al. .............. 307/10.1 |
| 6,510,381 B2 * | 1/2003 | Grounds et al. ............. 701/207 |
| 6,669,260 B2 | 12/2003 | Clark et al. |
| 6,697,638 B1 * | 2/2004 | Larsson et al. ........... 455/553.1 |
| 6,756,697 B2 * | 6/2004 | Mizutani et al. ........... 307/10.1 |
| 6,871,067 B2 * | 3/2005 | Clark et al. ................. 455/428 |
| 6,939,155 B2 * | 9/2005 | Postrel ....................... 439/297 |
| 6,963,728 B2 * | 11/2005 | Edwards et al. ............. 455/41.2 |
| 7,031,659 B2 * | 4/2006 | Tomoda et al. ............. 455/41.2 |
| 7,068,181 B2 * | 6/2006 | Chuey ................... 340/825.69 |
| 7,084,781 B2 * | 8/2006 | Chuey ................... 340/825.72 |
| 7,116,242 B2 * | 10/2006 | Guthrie ................. 340/825.22 |
| 7,183,941 B2 * | 2/2007 | Chuey ................... 340/825.69 |
| 2003/0006647 A1 * | 1/2003 | Rode et al. .................. 307/9.1 |
| 2003/0042792 A1 * | 3/2003 | Reinold et al. ............... 307/9.1 |
| 2003/0152088 A1 * | 8/2003 | Kominami et al. .......... 370/401 |
| 2004/0090121 A1 * | 5/2004 | Simonds et al. ............ 307/10.1 |
| 2004/0092253 A1 * | 5/2004 | Simonds et al. .......... 455/414.2 |

(Continued)

*Primary Examiner*—Matthew D Anderson
*Assistant Examiner*—April G Gonzales
(74) *Attorney, Agent, or Firm*—Foley & Lardner LLP

(57) ABSTRACT

A wireless electrical connectivity system for use in a vehicle includes a first transceiver coupled to at least one utility carrier and to a first plurality of electrical devices. The first transceiver is configured to communicate a plurality of utility signals. A control module is coupled to a second plurality of electrical devices and configured to control the selection and distribution of utility signals to the second plurality of electrical devices. The control module includes a second transceiver configured to communicate a plurality of utility signals with the first transceiver via a communication link and a user interface configured to receive user input commands regarding the selection of utility signals distributed to the second plurality of electrical devices.

18 Claims, 11 Drawing Sheets

U.S. PATENT DOCUMENTS

2004/0110472 A1* 6/2004 Witkowski et al. ......... 455/41.2
2004/0185778 A1* 9/2004 Biundo et al. .............. 455/41.2
2004/0245854 A1* 12/2004 Hattori et al. .............. 307/10.1

* cited by examiner

WIRELESS ELECTRICAL CONNECTIVITY SYSTEM FOR USE IN A VEHICLE

PRIORITY

This application claims the benefit of U.S. Provisional Patent Application No. 60/515,993, filed Oct. 31, 2003, titled "Wireless Electrical Connectivity System for Use in a Vehicle," hereby incorporated by reference in its entirety.

FIELD OF THE INVENTION

The present invention relates to electrical devices in a vehicle and, in particular, to a wireless electrical connectivity system for distribution of data, audio, video and command/control information to electrical devices in a vehicle and for control of electrical devices in a vehicle.

BACKGROUND OF THE INVENTION

Modular storage compartments in the forward portion of a vehicle are generally known and include consoles and structures for mounting items such as lamps, small storage compartments and electronic instrumentation such as compasses, temperature displays and clocks. Such modular systems typically have mounting configurations that permanently attach such articles to a structural portion of the vehicle, whereby installation of article options are typically conducted in a factory setting during vehicle construction and often requires user-selection of the desired articles prior to vehicle assembly, or user acceptance of preinstalled option packages. Typically, each electrical article or device attached to a modular system or located elsewhere in the vehicle is controlled separately by an occupant of the vehicle (e.g., a driver or passenger). For example, each article may include a user interface (e.g., buttons, display, etc.) used to select and/or control the operation of the article. In addition, the distribution of power, data, audio and/or video signals to each electrical article in the vehicle, including articles attached to a modular system, is typically achieved using a wired connection between each article (or the modular system) and, for example, a vehicle bus and/or a radio head.

Accordingly, it would be advantageous to provide a modular system for interchangeably mounting a wide array of selectively removable, user-oriented articles that are adapted for use within, or in conjunction with, a vehicle. It would also be advantageous to provide a control module that is configured to provide a single point of control and a user interface for multiple electrical articles in a vehicle, such as electrical articles mounted to a modular system. It would also be advantageous to provide a wireless electrical connectivity system to distribute or communicate data, audio, video and/or command and control signals to and/or between electrical articles/devices in a vehicle. It would further be advantageous to provide a wireless electrical connectivity system in a vehicle to reduce and/or eliminate wiring for data, audio, video and command and/or control signals.

SUMMARY

In accordance with one embodiment, a wireless electrical connectivity system for use in a vehicle includes a first transceiver coupled to at least one utility carrier and configured to communicate a plurality of utility signals, the at least one utility carrier coupled to a first plurality of electrical devices, and a control module coupled to a second plurality of electrical devices and configured to control the selection and distribution of utility signals to the second plurality of electrical devices. The control module includes a second transceiver configured to communicate a plurality of utility signals with the first transceiver via a communication link and a user interface configured to receive user input commands regarding the selection of utility signals distributed to the second plurality of electrical devices. The control module may be further configured to control the delivery of utility signals between the second plurality of electrical devices and the first transceiver. The utility signals include, for example, data signals, audio signals or video signals. The control module may mounted to a modular system in the vehicle. The second plurality of electrical devices may also be coupled to the modular system in the vehicle.

In accordance with another embodiment, a wireless electrical connectivity system for use in a vehicle includes a first transceiver coupled to at least one utility carrier and configured to communicate a plurality of utility signals. The at least one utility carrier is coupled to a first plurality of electrical devices. The system further includes a control module coupled to a second plurality of electrical devices and configured to control the operation of each device in the second plurality of electrical devices. The control module includes a second transceiver configured to communicate a plurality of utility signals with the first transceiver via a communication link and a user interface configured to receive user input commands regarding the operation of at least one device of the second plurality of electrical devices. In one embodiment, the control module is further configured to control the distribution of the utility signals to the second plurality of electrical devices. The control module may also be further configured to control the delivery of the utility signals between the second plurality of electrical devices and the first transceiver. The utility signals may include, for example, data signals, audio signals, video signals or control signals. In another embodiment, the system further includes a door switch located in a vehicle door and a transmitter coupled to the door switch and configured to generate a control signal in response to the door switch, the control signal for activating an electrical device in the vehicle. The transmitter transmits the control signal to the control module. In yet another embodiment, the control module is mounted to a modular system in the vehicle. The second plurality of electrical devices may also be coupled to the modular system in the vehicle.

In accordance with yet another embodiment, a wireless electrical connectivity system for use in a vehicle includes a first wireless communication module coupled to at least one utility carrier and having a first transceiver configured to communicate a plurality of utility signals. The at least one utility carrier is coupled to a first plurality of electrical devices and configured to distribute the plurality of utility signals. The system further includes a second wireless communication module coupled to a second plurality of electrical devices and having a second transceiver configured to communicate a plurality of utility signals with the first transceiver via a communication link. The second wireless communication module is configured to deliver the plurality of utility signals to at least one electrical device of the second plurality of electrical devices. The utility signals may include, for example, data signals, audio signals, video signals or control signals. In another embodiment, the system may further include a door switch located in a vehicle door and a transmitter coupled to the door switch and configured to generate a control signal in response to the door switch, the control signal for activating an electrical device in the vehicle. The transmitter transmits the control signal to the second wireless communication module. In yet another embodiment, the second wireless communication module is mounted to a modular system in the vehicle. At least one electrical device of the second plurality of electrical devices may also be mounted to the modular system in the vehicle.

BRIEF DESCRIPTION OF THE DRAWINGS

The invention will be more readily understood by reference to the following description taken with the accompanying drawings, in which.

DESCRIPTION OF PREFERRED EMBODIMENTS

Vehicles typically include a plurality of electrical devices/articles such as a radio, a CD player, a DVD player, a clock, a compass, a navigation system, etc. These electrical devices may be located throughout the vehicle. For example, a radio may be installed at the front of the vehicle in a dashboard as part of a radio head, a DVD player may be mounted to the roof or floor of a vehicle, a CD player may be installed in a trunk or glove compartment of the vehicle or a compass may be located in a rear view mirror of a vehicle. In addition, a modular system may be provided in a vehicle for interchangeably mounting one or more selectively removable articles, including electrical articles, in the vehicle. In order to operate the electrical devices in a vehicle, power must be provided to the electrical devices at various locations within the vehicle. In addition, data, audio, video and/or command and control signals may need to be distributed to and/or between electrical devices/articles in the vehicle. For example, the audio signals from a CD player (e.g., located in a trunk or mounted to a modular system in the vehicle) may be communicated to an audio system in the vehicle so that the sound from the CD player may be heard over the vehicle speakers.

Figure 1:
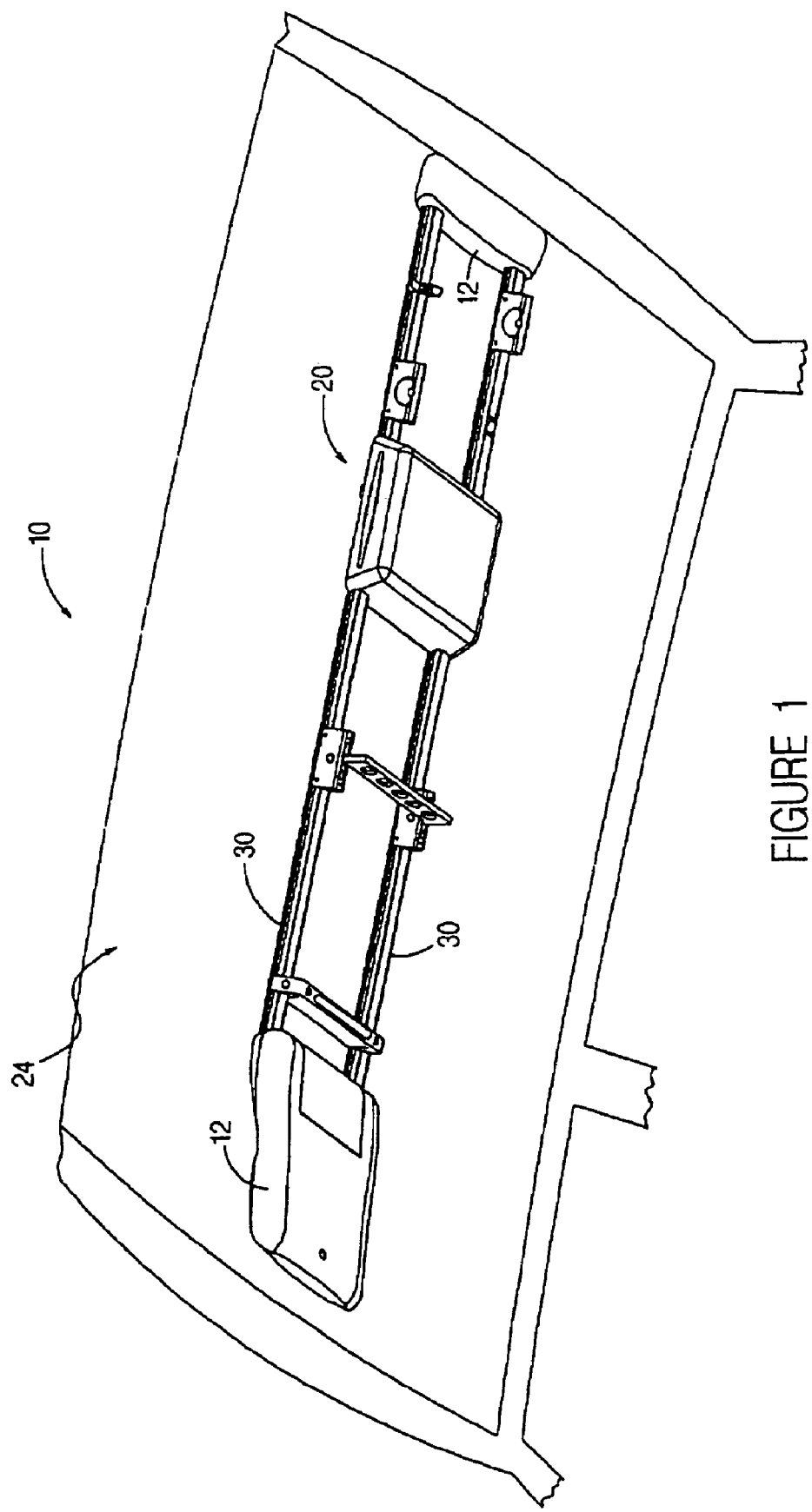
FIG. 1 is an upward-looking perspective view of a modular system mounted on a vehicle interior in accordance with an embodiment.
Figure 2:
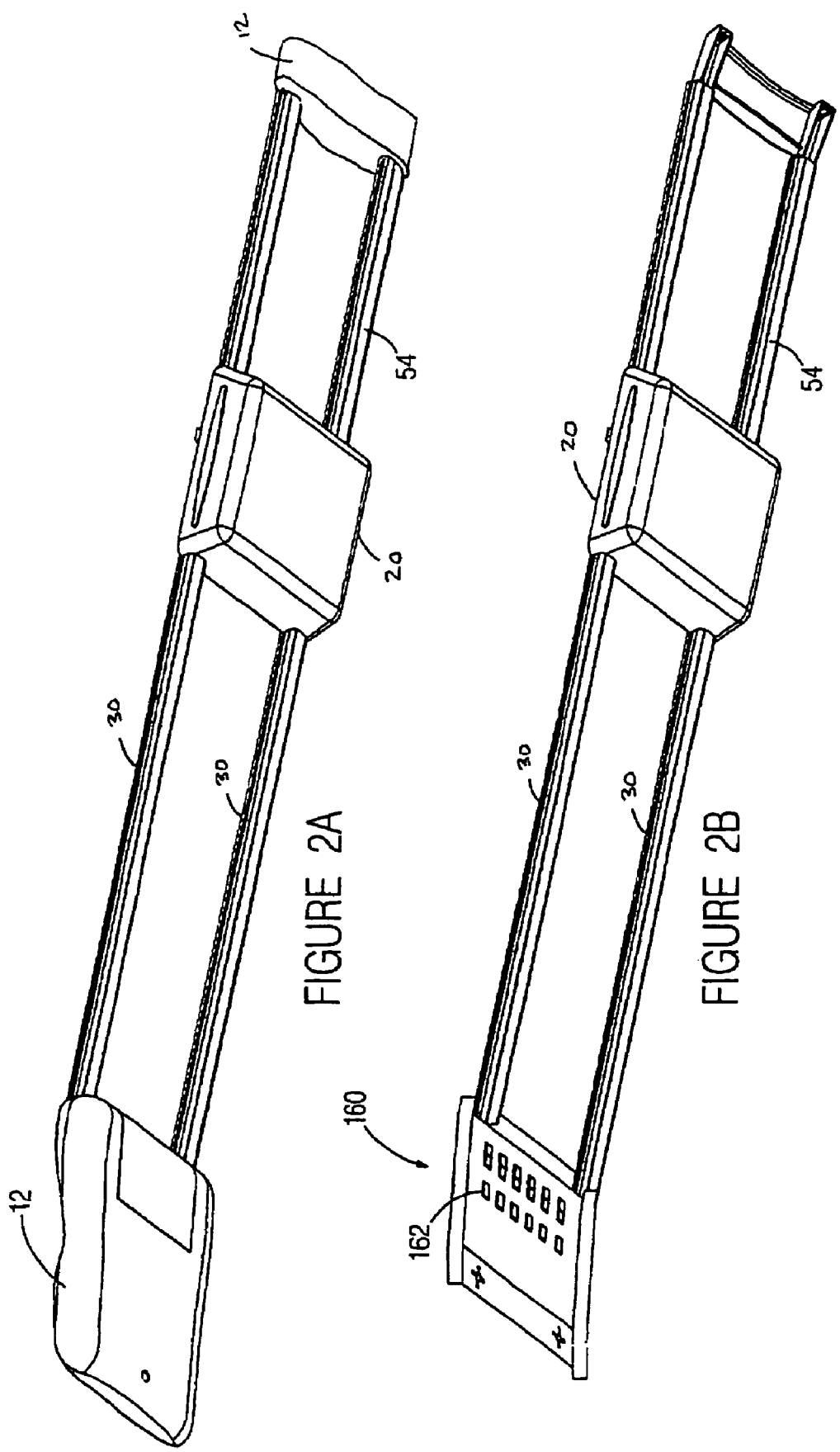
FIG. 2A is an upward looking perspective view of a modular system with end cover trim pieces in accordance with an embodiment.
FIG. 2B is an upward looking perspective view of a modular system with end cover trim pieces removed in accordance with an embodiment.

As mentioned above, a modular system may be provided in a vehicle so that additional articles, including electrical devices, may be installed in the vehicle. Referring to FIGS. 1 and 2, a modular system 10 for mounting one or more articles 20 is shown schematically (exemplary articles will be further described herein) along an interior panel 24 (e.g. door or side panel, cover, headliner, etc.) of a vehicle in accordance with an embodiment. System 10 may also be adapted for mounting articles 20 along the sides of the vehicle such as door or side panels, or within the interior space of the vehicle such as cargo areas, in a manner similar to the method described herein. System 10 includes two generally parallel mounting members 30 such as rails, tracks, channels, holders, bars, rods, poles, etc. that are oriented in any desired configuration within a vehicle along interior panel 24. Members 30 have a lateral spacing that is generally fixed for a particular vehicle style, but the spacing may vary between different vehicle styles and models and may have any lateral spacing suitable for mounting articles 20. One or more positioners 31 shown schematically in FIG. 3 may be used to secure the lateral spacing of members 30 for receiving articles 20. For overhead applications, members 30 may be oriented longitudinally, centered laterally within the vehicle, but may be located at any lateral position on the interior panel 24 to accommodate mounting of articles 20. In an alternative embodiment, members 30 may be separated into a forward segment and/or a rearward segment (not shown) for adapting to roof windows or other discontinuities in the roof structures. Members 30 may also be oriented laterally along interior panel 24 to increase the flexibility and utility of the system for interchangeably receiving the articles 20. In another alternative embodiment, a single member 30 may be used in conjunction with articles 20 that are adapted to selectively and interchangeably engage a single member 30. In a further alternative embodiment, members 30 may be mounted to pillars (not shown) or other generally vertical support columns within the interior space of a vehicle to provide a system for attaching articles 20. Such pillars may be secured by articles mounted to the members 30 for increased flexibility in attaching articles to the pillar-mounted members.

Figure 6:
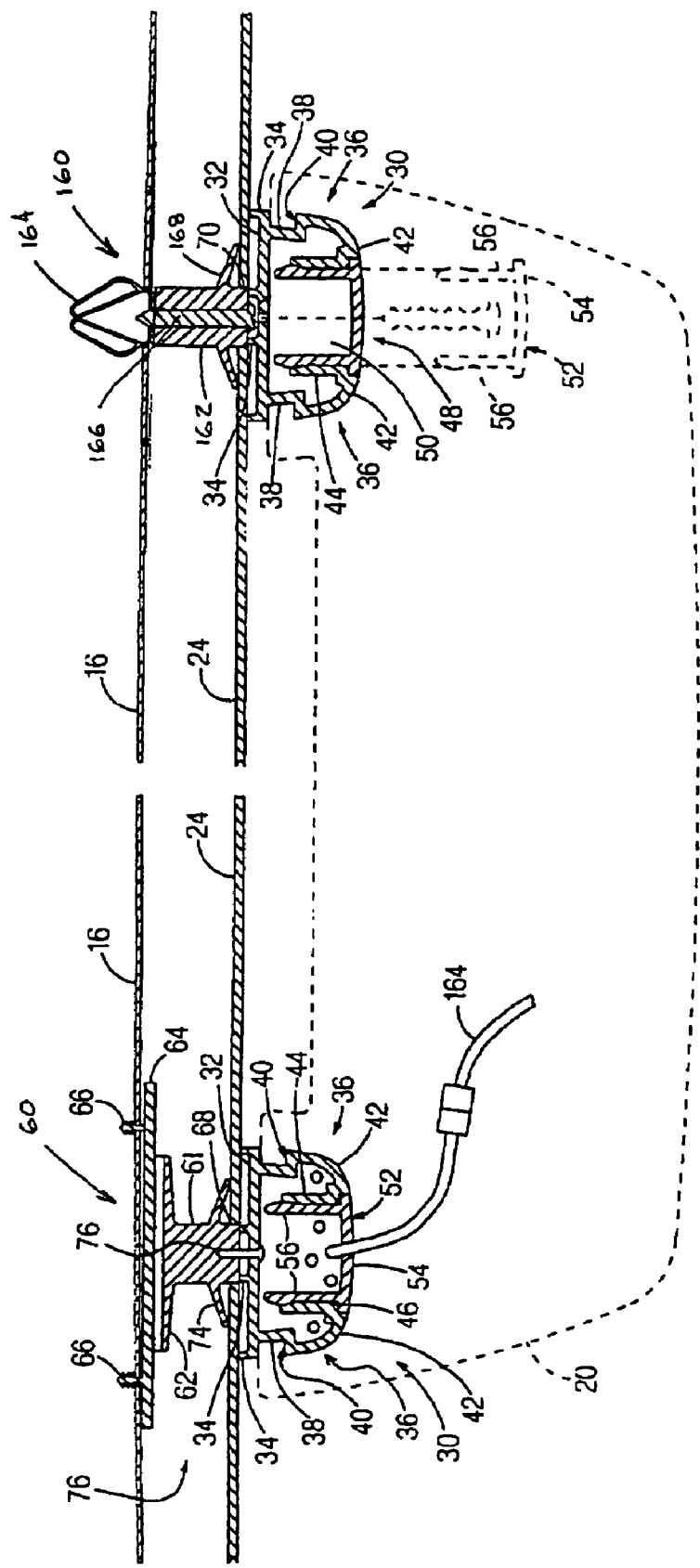
FIG. 6 is a cross sectional view of a modular system along line 6-6 of FIG. 3 in accordance with an embodiment.

Referring to FIG. 6, the structural shape of members 30 are shown in accordance with an embodiment. Members 30 have a generally hollow cross sectional shape as shown in FIG. 6, and include a generally flat base 32 (e.g. back, contact surface, etc.) on the top of member 30 with several longitudinal ribs 34 projecting therefrom. Ribs 34 are provided at the outside edges to grip the surface of interior panel 24 and a pair of ribs 34 are located centrally for alignment with connectors 160 or 60 when members 30 are secured to the roof structure. Members 30 further include integral sides 36 having a recess 38 (e.g. notch, inset, slot, groove, channel; etc.) forming an outwardly projecting supporting ledge 40 (e.g. corner, shoulder, edge, etc.). Recesses 38 and ledges 40 provide an external structure for receiving and supporting the articles 20 (shown schematically) having corresponding structure adapted to mate with ledges 40. In a particularly preferred embodiment, ledge 40 is horizontal (as shown) and ledge 40 and recess 38 are formed having an angle of 90 degrees or less for providing a structure for receiving articles 20. In an alternative embodiment, member 30 may have a circular cross sectional shape (not shown) or any other shape where the exterior surface is configured to provide longitudinal recesses and ledges similar to recesses 38 and ledges 40 for receiving and supporting the articles 20. In another alternative embodiment, member 30 may have a second recess and ledge (not shown) for providing an alternative article mounting interface and providing structure adaptable for mounting interlocks that may prohibit or allow installation of certain articles along particular locations of members 30.

Beneath ledges 40, sides 36 include inwardly curved lower sections 42 that terminate into a return bend 44 providing internal corners 46 to create a longitudinal opening 48. Opening 48 creates a passage 50 (e.g. channel, path, conduit, tunnel, etc.) within members 30 for routing utility carriers such as wires, cables, fiber optics, etc. as shown schematically in FIGS. 5 and 6. A removable cap 52 is provided generally along the entire length of member 30 having a cover 54 to cover opening 48 and retain utility carriers, and may have a flush fit with member 30, or may have projecting contours, ribs, or other decorative or useful structure (not shown). Cap 52 includes two inwardly projecting legs 56 that fit within opening 48 and are removably retained in place by an interference type, snap-fit engagement with return bends 44. Opening 48 may be entirely or partially concealed by inserting one or more caps 52 having segments of various lengths tailored to create an access pattern within members 30. The access pattern may be created or modified at any time for selectively providing access to opening 48 along the length of member 30. Member 30 and cap 52 are preferably made of acrylonitrile butiadene styrene (ABS) plastic in an extrusion process, and may be provided in a wide variety of colors designed to accent an interior trim color scheme. Alternatively, members 30 and cap 52 may be made of aluminum or any other suitable material, wherein members 30 or cap 52 may also serve as a conductor for transmitting low voltage electrical power from a vehicle supply source to articles 20 mounted on members 30. The outer surface of the aluminum members is preferably anodized which provides an insulating layer on the exterior of the member, which may be selectively removed to provide a custom-tailored electrical conductivity access pattern. Portions of members 30 and cap 52 that are not otherwise enclosed by articles 20 may also have a separate insulating cover (not shown) that snap fits into recesses 38 and ledges 40 to electrically isolate members 30 from consumer contact or inadvertent contact with an electrical ground. Members 30 and cap 52 may also be made of any other material suitable for forming an elongated support member and receiving mounting structure from articles 20 to be supported therefrom.

Figure 4:
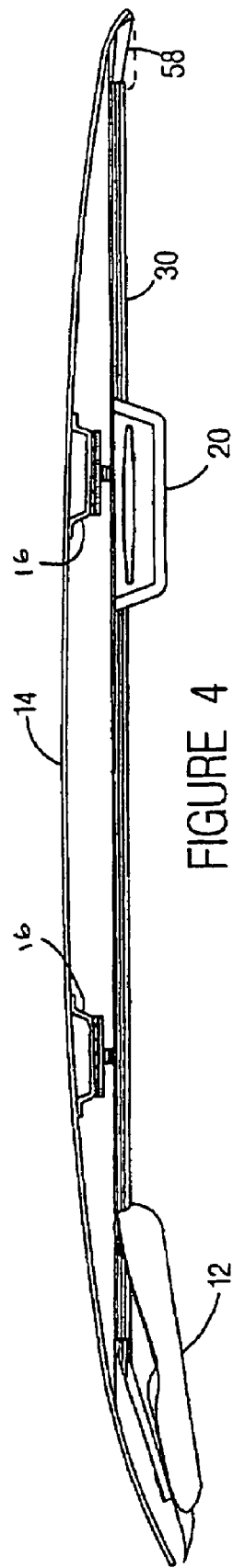
FIG. 4 is a side elevation of a modular system in accordance with an embodiment.

Referring to FIG. 4, members 30 are secured to the vehicle in accordance with an embodiment. The ends of members 30 are rigidly attached to the forward and rearward edges of the roof frame (e.g. beams, headers, bows, cross-pieces, etc.— not shown) by welding, brazing or fastening with conventional fasteners (not shown). Members 30 may have ends attached directly to the frame, or members 30 may be attached to the roof frame via fixtures shown schematically as brackets 58. Brackets may also be provided to support the ends of member segments that abut a roof discontinuity such as a sunroof, etc. The forward and rearward end connections of members 30 are covered by suitable trim components shown schematically as a bezel or molding 12. Members 30 may have a side profile that is straight, or a side profile that is slightly curved or bowed (not shown) to correspond with the panel profile 14 (shown as a roof panel). In an alternative embodiment, members 30 may be secured to door panel structures (not shown) or to pillars or other support columns (not shown) within the interior of the vehicle. Such support columns may be permanently fixed to the interior vehicle structure or may be removably or retractably attached to vehicle structure such as the floor, roof or sides of the vehicle to create a modular system for attaching articles within any interior location of a vehicle.

Referring further to FIGS. 4 and 6, a structural support system for the interior span of members 30 is shown in accordance with an embodiment. The interior span of members 30 are coupled to the roof structure of the vehicle using connectors 160 (e.g. Z-axis clips) having a spacer portion 162 with spring clip 164. Fastener 166 may be used to secure member 30 to spacer portion 162 and for securing spacer portion 162 to spring clip 164 to ensure the structural integrity of system 10. Spacer portion 162 may project through an aperture 70 in panel 24 to provide secure abutment with the back of member 30, and supports 168 may project outwardly from spacer portion 162 to provide support to panel 24 around aperture 70. Connectors 160 are attached to one or more lateral frame members 16 (e.g. beams, roof bows, door panels, floor panels, cross headers, etc.) at a lateral position along frame member 16 corresponding to the installation position of members 30. An alternative connector type may also be used such as that shown by connector 60 in FIG. 6. Connectors 60 have a spacer portion 61 and a base portion 62 coupled to a platform 64 that is attached to frame member 16 by finned-plugs 66 (e.g., "Christmas tree connectors") or by a structural adhesive (not shown) such as "BETAMATE 73705" which is a polyurethane adhesive manufactured by the Dow Chemical Corporation and available through Sound Alliance, LLC located in Auburn Hills, Mich. In an alternative embodiment, connectors 60 may be attached to frame member 16 by a two-piece reclosable fastener system (not shown) such as "DUAL LOCK"® having mushroom-head shaped projections and manufactured by the Minnesota Mining and Manufacturing Company, or by a nylon "VELCRO"® hook and fastener structure available from Velcro USA Inc. located, in Manchester, N.H. The end of connector 60 opposite from base 62 has a pedestal section 68 that extends through aperture 70 in panel 24 to engage base 32 of members 30. The end of pedestal 68 is configured to abut ribs 34, and an annular projection 72 extending from the end of pedestal 68 is configured to be captured between longitudinal ribs 34 to improve lateral stability of members 30. Connectors 60 further include supports 74 (wings, braces, arms, etc.) to support the back surface of panel 24 in the proximity of aperture 70. In a preferred embodiment, connectors 160 and 60 are made from ABS, polycarbonate or other suitable plastic and spring clip 164 is made from heat-treated spring steel or wire, however, connectors 160 and 60 may have any shape and material composition appropriate for transferring the load from system 10 through members 30 to frame member 16, and connector 60 may be attached to frame member 16 by any suitable means providing the appropriate tensile strength. Connectors 160 and 60 have a spacer length corresponding to the gap 76 between frame member 16 and panel 24. Following panel 24 installation over pedestal 68 of connectors 60 in the vehicle, members 30 may be positioned over panel 24 and aligned with connectors 160 or 60, whereby members 30 are secured by a threaded fastener or 166 or 76 through base 32 and into connector 160 or 60. In alternative embodiments, other connector structures may be used such as solid blocks (not shown), and panel 24 may be provided without apertures 70 whereby a fastener penetrates the base, panel and the connector. In another alternative embodiment, members 30 may be bowed into a shallow arch-like profile (not shown) and installed with a compression fit between the forward and rearward ends of the roof frame, or other vehicle structure such as floor and roof panels, thus obviating or minimizing the need for mid-span connectors. Further, members 30 may be mounted against panel 24, or alternatively panel segments may be positioned around members 30.

Referring further to FIG. 1, a variety of articles 20 may be mounted to members 30 according to a preferred embodiment. Articles 20 may include storage compartments (with or without key-lock access control) tailored to hold tissues, sunglasses, remote control devices, wireless phones, pagers, personal data assistants (PDA), walkie-talkies, binoculars, cameras, first aid or road-side emergency kits, tools, baby-care products and supplies, arts and crafts supplies, toys, sporting goods, books, maps, hunting and fishing equipment, and many other articles for which readily accessible storage in a vehicle may be useful. Such storage compartments may either be fixed or designed for pull-down, drop-down or rotational access where the compartment is recessed during storage and extended for access during usage. Articles 20 may also include handles, brackets, fixtures (e.g. starter block) for mounting racks, cages, or support pillars for optionally receiving members 30 to mount additional articles 20 in a cargo area; lighting equipment, power adapters and outlets, lighters; visual display screens; audio equipment; media displays; digital video disc players; GPS receivers; cargo storage racks, straps or tie-downs; garment hangers, rods or racks; insulated hot or cold-storage containers, mobile office workstation components, portable air compressors or vacuum cleaners, cargo netting and holders; occupant safety features; specially-adapted consumer-use products such as travel tables, camping gear, pet barriers, luggage, etc.; brackets having rigid, swiveling or rotating couplers for removably receiving such consumer use products; storage racks having fixed or retractable support members for storing skis or other gear; and any other articles which may be useful in conjunction with traveling, working or other vehicle use.

Articles 20 are adapted to be selectively positionable along members 30, however, articles that may deemed to create a distraction to the vehicle operator, such as video displays and the like, are provided with a mounting interlock feature which prevents their installation in certain prohibited positions along the members, for example, allowing video monitors to be installed only in a rearward portion of the vehicle. The interlock function may be accomplished by altering the cross sectional shape or profile of a portion of the members (not shown) or providing a second recess and ledge (not shown). Particular articles 20 may be provided with a mounting profile for engaging members 30 that includes a projection (not shown) that extends into passage 50 whereby installation of a blank (not shown) within a particular portion of passage 50 along member 30 will prevent mounting such articles in the selected locations. Alternatively installation of articles may be selectively restricted by otherwise altering the profile of the members to fit only selected article mounting profiles and may be accomplished by adding a shim (not shown) along one or more sides of member 30 or in connection with the passageway of the member.

Articles 20 suitable for suspension from a single member are configured for attachment to a single member 30 by having means for releasably connecting to the recess 38 and ledge 40 on each side of a member 30. Articles 20 that are more suitable for suspension from two members 30 are configured having a first means on one side of the article for attaching to the recess 38 and ledge 40 on one or both sides of the first member 30, and are configured having a second means on the opposite side of the article for attaching to the recess 38 and ledge 40 on one or both sides of the second member.

Various components or methods may be used for attaching articles 20 to members 30 as described in U.S. Pat. No. 6,668,260, entitled "Modular System For A Vehicle," issued Dec. 30, 2003 and incorporated herein by reference in its entirety.

Figure 3:
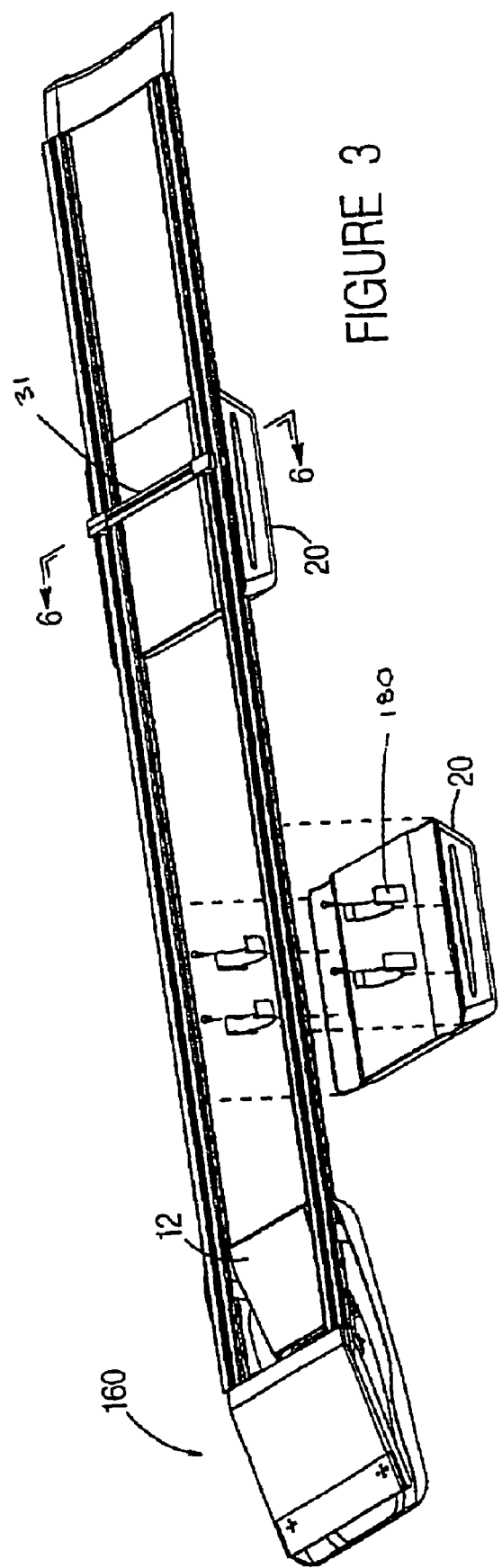
FIG. 3 is a downward looking perspective view of a modular system in accordance with an embodiment.
Figure 5:
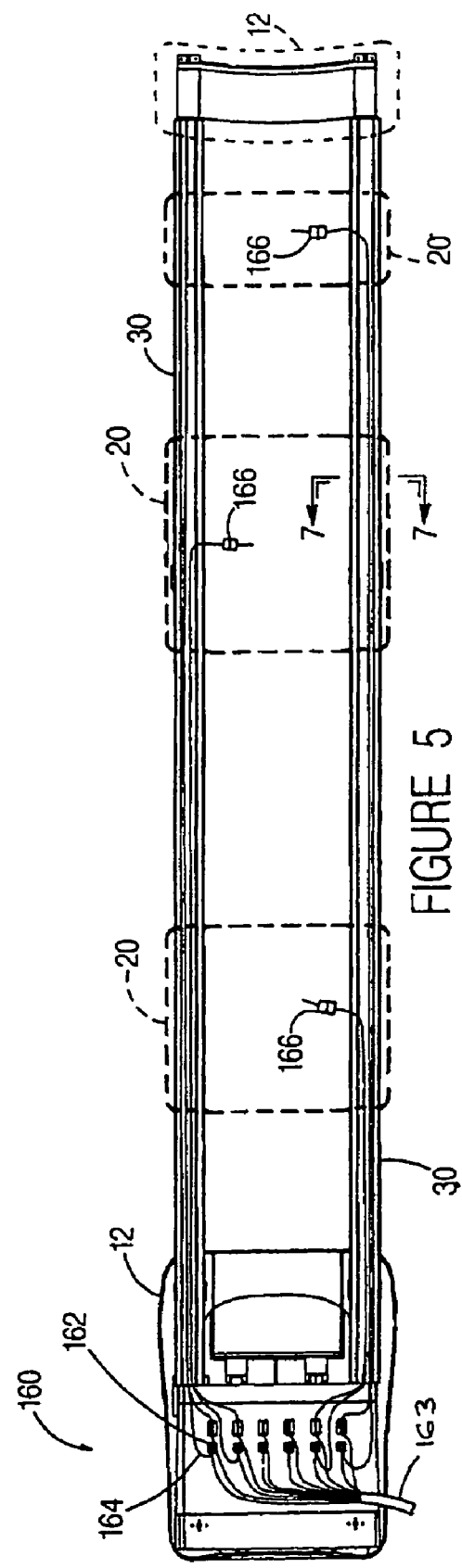
FIG. 5 is an upward looking bottom view of a modular system in accordance with an embodiment.

As mentioned above, electrical articles installed in the vehicle, including those mounted to the modular system 10, are typically coupled to a power source as well as to other devices in the vehicle in order to transmit and/or receive data, audio, video and/or command and control signals. Such signals may be provided to and between electrical devices in a vehicle via a wired connection, for example, a vehicle bus. Modular system 10 may be configured to distribute power and data to/from the articles attached to members 30 of modular system 10. Referring to FIGS. 3 and 5, a utility interface 160 for modular system 10 is shown schematically. Interface 160 is included within the cover 12 for communicating with passageways through the roof structure (not shown) and interfacing with members 30. Interface 160 includes a series of ports 162 (e.g. connectors, receptacles, jacks, plugs, etc.) for facilitating the interconnection of conventional utility carriers 163 (e.g. wires, cables, conductors, harnesses, etc.) for delivering utilities (e.g. electrical power, voice and data communication signals, RF transmission signals, instrumentation signals, etc.) between a supply source (not shown) and articles 20 mounted to members 30. Utilities may be routed from the utility supply source (e.g. a battery, antenna, receiver, transmitter, etc.—not shown) through utility carriers 163 that interconnect the supply source and the ports 162 provided in interface 160. Utility interface 160 may be provided in either the forward or rearward portion of the vehicle.

Utilities may be distributed from interfaces 160 via additional utility carriers 164 that interconnect between interfaces 160 and articles 20. The utility carriers 164 may be distributed throughout system 10 by routing the carriers 164 through passage 50 in members 30 where the carriers 164 are concealed behind cover 54 (shown in FIG. 6) and articles 20. Articles 20 are mounted over members 30 and their covers segments 54, whereby one or more gaps or other openings corresponding to access and egress locations for utilities carriers 164, interfacing with articles 20 may be provided in cover 54, behind article 20, to create a utilities access pattern. The access pattern is adaptable to future changes or modifications in the article selection package by making suitable changes in the removable cover 54 of members 30. Articles 20 and utility carriers 164 may be provided with mating connectors 166 to facilitate ease of installation, replacement or reconfiguration of articles 20 within the system 10. Alternatively, articles 20 may be provided with a fixed length of utility carrier for routing through passage 50 to interface 160, where the carrier includes a terminal at the outward end configured for directly connecting with interface 160. To provide additional flexibility in distributing utilities to various articles, an article 20 may be configured to serve as a utility storage or junction box for housing additional utility distribution devices or components and for storing excess quantities of utility carrier that may be desirable for accommodating future changes to the article selection package.

Alternatively, as mentioned above with respect to FIGS. 5 and 6, a low-voltage electrical power in the range of approximately 12-42 volts DC or other suitable voltage range for powering articles 20 may be routed to articles 20 via members 30, where members 30 are fabricated entirely or partially from aluminum or other electrically conductive material. Members 30 may also be fabricated from a non-conducting material such as plastic, where a conducting material such as copper or aluminum is integrally formed with member 30 in the shape of a longitudinal conducting strip, rail or bar (not shown) to provide a uniform electric current access path from interface 160 to articles 20. Such conducting material may be affixed to member 30 by ultrasonic welding, molding, interference-type snap insert, or vacuum metallization. Articles 20 are provided with an electrically conductive contactor (not shown) that projects outwardly from a surface of article 20 and is configured to contact member 30 or a conducting strip thereon (not shown) and remains concealed between member 30 and article 20 when article 20 is installed on member 30 to provide a conductive electrical path to article 20. The contactor may be spring-biased for urging the contactor into continuous contact with member 30 or a conducting strip when article 20 is mounted on members 30. In a preferred embodiment where a system with two parallel members are used, one member 30 would have a positive electrical polarity (i.e. battery potential) and the second member 30 would have a negative electrical polarity (i.e. ground). For embodiments using a single member, two longitudinal conducting strips (not shown) may be used on member 30 to provide positive and negative conductors, corresponding to appropriately positioned contactors on an article 20 configured to mount to a single member 30.

Figure 7:
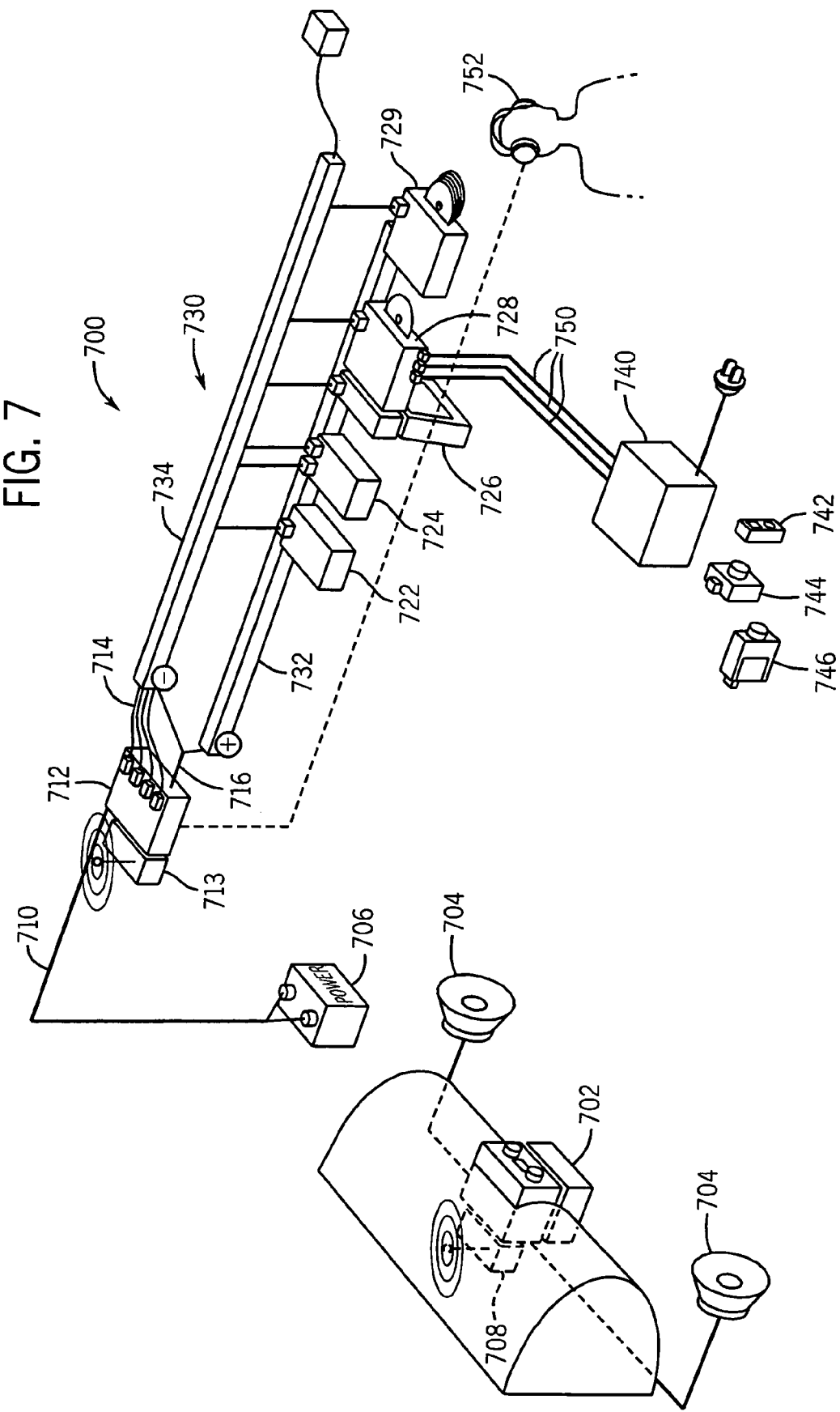
FIG. 7 is a block diagram of a wireless electrical connectivity system in a vehicle in accordance with an embodiment.

Each article 20 installed on modular system 10 as well as devices located elsewhere in the vehicle is typically controlled separately (e.g., using a user interface of each article or device) by an occupant of the vehicle. A wired connection (e.g., utility carrier 163 and utility interface 160) may be used to deliver utilities between a supply source and modular system 10 as well as between electrical articles or devices in the vehicle, including between articles and devices mounted to a modular system. FIG. 7 is a block diagram of a wireless electrical connectivity system for use in a vehicle in accordance with an embodiment. In the system 700 shown in FIG. 7, a wireless communication link may be utilized to deliver utilities such as data, audio, video and/or command and control signals between a supply source (e.g., radio head 702) and articles mounted on members 730. Radio head 702 includes an audio system (e.g., a radio, speakers 704, etc.) that is coupled to at least one utility carrier (e.g., an audio bus, a vehicle bus, etc.). Accordingly, information and signals from other devices in the vehicle that are coupled to the utility carrier may be accessed by radio head 702. A transceiver 708 is coupled to radio head 702 and is configured to transmit and receive data (e.g., audio signals, command signals, etc.). Alternatively, a separate transmitter and receiver may be coupled to radio head 702 to transmit and receive signals, respectively. Transceiver 708 may be configured to communicate using a known wireless communications standard for transmission of data, audio, command and control signals, for example, Infrared (IrDA), Bluetooth, wireless LAN (IEEE 802.11), 900 MHz FHSS (frequency hopping spread spectrum).

A control module 712 is coupled to members 730 of a modular system and a power source 706. Preferably, control module 712 is in a location visible and accessible to a driver of the vehicle, however, control module 712 may also be mounted in other locations in the vehicle (e.g., accessible to other vehicle occupants). Power source 706 (e.g., a battery) is connected to the control module 712 via a conventional utility carrier 710. Control module 712 is coupled to a transceiver 713 that is configured to transmit and receive data (e.g., audio signals, command signals, etc.). Alternatively, a separate transmitter and receiver may be included in control module 712 to transmit and receive data, respectively. Transceiver 713 may be configured to communicate using a known wireless communications standard for transmission of data, audio, command and control signals, for example, Infrared (IrDA), Bluetooth, wireless LAN (IEEE 802.11), 900 MHz FHSS (frequency hopping spread spectrum). Radio head 702 and control module 712 are configured to communicate wirelessly via transceivers 708 and 713.

Figure 8:
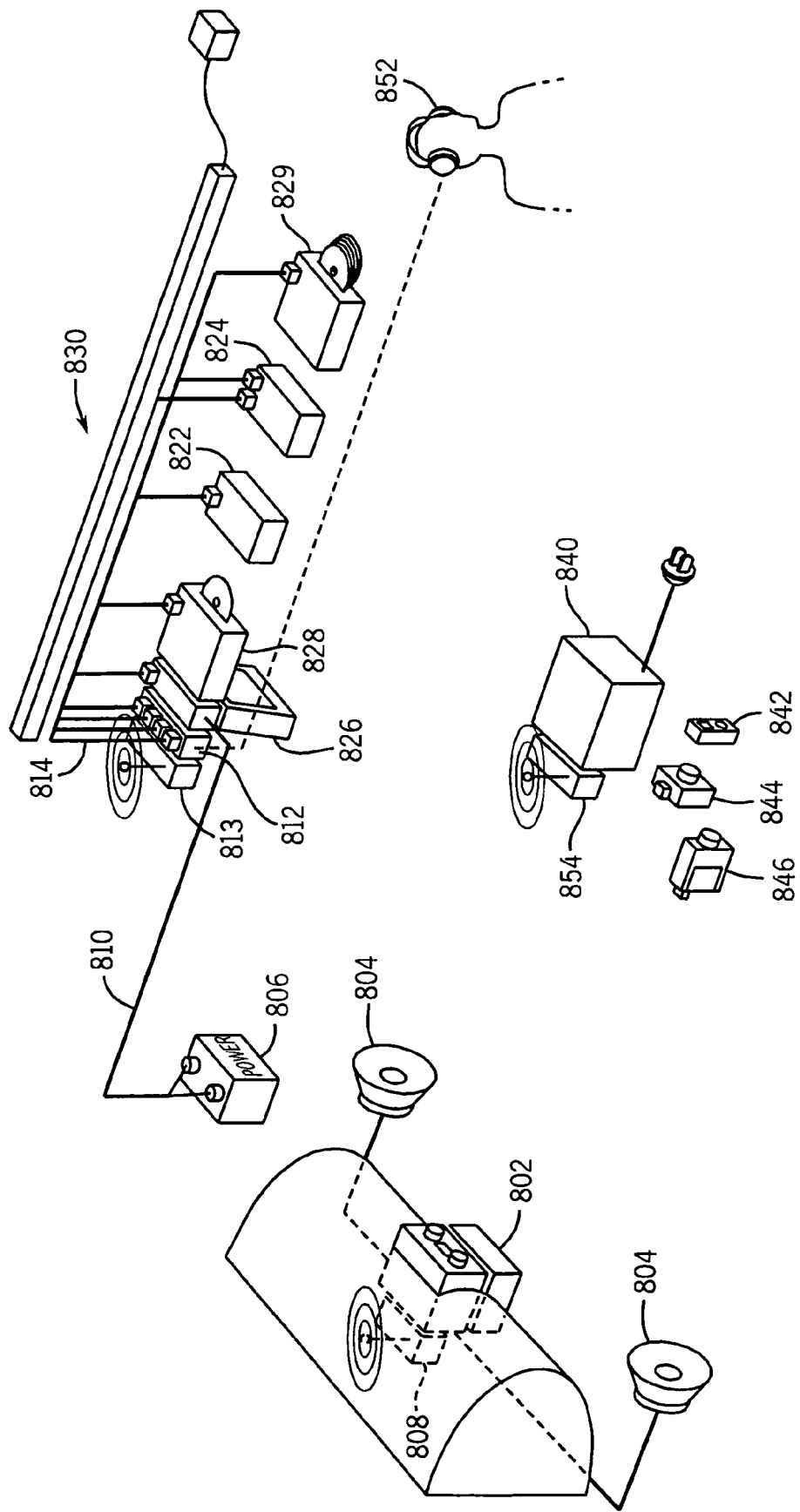
FIG. 8 is a block diagram of a wireless electrical connectivity system in a vehicle in accordance with an alternative embodiment of the invention.

Power or data received by control module 712 from utility carrier 710 and transceiver 713 are distributed from control module 712 via utility carriers 714, 716 to articles (e.g., Rear HVAC 722, XM Radio 724, Display 726, DVD player 728 and CD player 729) installed on members 730. Utility carriers 714 and 716 interconnect between control module 712 and the articles mounted on members 730. As mentioned above, utility carriers 714, 716 may be distributed throughout the modular system by routing the carriers through a passage 50 (shown in FIG. 6) in members 730, where the carriers are concealed behind a cover 54 (shown in FIG. 6) and the articles. In the embodiment shown in FIG. 7, the modular system includes two parallel members 732, 734, where one member 732 has a positive electrical polarity (i.e., battery potential) and one member 734 has a negative electrical polarity (i.e. ground). In an alternative embodiment, as shown in FIG. 8, a single member 830 is provided and power may be provided, for example, using two longitudinal conducting strips (not shown) on member 830 to provide positive and negative conductors. Returning to FIG. 7, articles are mounted to members 730 and may access utility carriers 714, 716 via, for example, one or more gaps or openings corresponding to access and egress locations for utility carriers 714, 716. As described above with respect to FIGS. 3 and 5, the articles and/or the utility carriers may be provided with a connector to facilitate installation.

Other electrical devices that are not installed or mounted to the vehicle, such as a video game system 740, an MP3 player 742, a digital camera 744 or a digital video camera 746, may be used in conjunction with an article, such as DVD player 728 and display 726, that is installed or mounted in the vehicle. As shown in FIG. 7, an auxiliary input 750 (e.g., a utility carrier) is used to connect a video game system 740 to a DVD player 728 and display 726. In an alternative embodiment, as shown in FIG. 8, a electrical device that is not installed in the vehicle, such as video game system 840, may be coupled to a transceiver 854. Alternatively, a separate transmitter and receiver may be coupled to the video game system 854 to transmit and receive signals, respectively. Transceiver 854 is configured to transmit and receive data (e.g., audio signals, command signals, etc.). Transceiver 854 may be configured to communicate using a known wireless communications standard for transmission of data, audio, video, command signals, etc. Accordingly, video game system 840 and DVD player 828 can communicate wirelessly via transceiver 854 and transceiver 813 that is coupled to control module 812. A wired auxiliary input connection is therefore not required. In another embodiment, control module 812 (712 shown in FIG. 7) may be used as a conduit for communication between any articles located in the vehicle, including articles not mounted to a modular system but located elsewhere in the vehicle. Accordingly, control module 812 may be used to facilitate article to article communication in the vehicle. For example, a CD player mounted in a trunk may be coupled, either wired or wirelessly, to the control module 812 which may be used to communicate, for example, audio or control signals between the CD player and a vehicle audio system.

Figure 9:
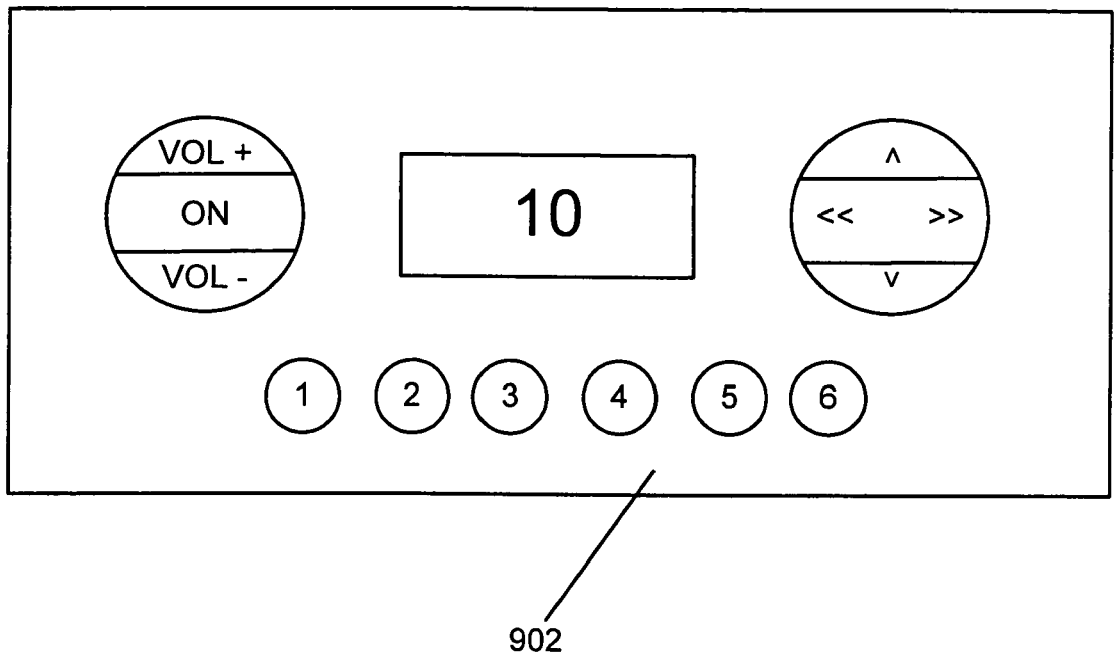
FIG. 9 is an exemplary user interface for a control module of the system in FIGS. 7 and 8 in accordance with an embodiment.

Returning to FIG. 7, control module 712 is also configured to allow a user to select an article or device mounted to the modular system to be operated and to control the operation of the selected article. For example, a user may select to operate a DVD player 728. Control module 712 preferably includes a user interface (not shown) from which a user may provide command and control functions. FIG. 9 shows an exemplary user interface 902. A user can control functions of the selected device such as Play, Stop, Volume, Disk/Track change, etc.

using the user interface (e.g. buttons or switches) of control module 712. Accordingly, control module 712 provides a single user interface and point of control and access from which a vehicle occupant (e.g., a driver) can control all of the electrical devices or articles mounted to members 730 of the modular system. As mentioned previously, control module 712 may also be used to control the communication between articles in the vehicle that are not mounted to the modular system. Control module 712 may also be configured to control or select the distribution of utilities to articles in the vehicle. For example, control module 712 may provide a single point of access (or a gateway) for the articles on the modular system to the radio head 702 or other in-vehicle devices. All of the audio outputs of the articles mounted to members 730 may be connected to control module 712 via; for example, utility carrier(s) 714 or wireless communication (as discussed below). Accordingly, a user can select which device or article is being heard over the vehicle speakers 704. In another embodiment, control module 712 may be configured to simultaneously broadcast a plurality of audio signals from a plurality of articles. The audio signals may be broadcast, e.g., by RF, IR or wired connections, to headphones 752 in the vehicle. Each set of headphones 752 includes a user interface to select one of the audio signals (e.g., channel A, B, or C) being simultaneously broadcast in the vehicle cabin by control module 712. A user may, therefore, select an audio signal from one of a plurality of sources to listen to on headphones 752.

Control module 712 may be a stand alone module mounted to members 730 as shown in FIG. 7 or alternatively, control module 712 may be incorporated into another article. Control module 712 may include various types of control circuitry, digital and/or analog, and may include a microprocessor, microcontroller, application-specific integrated circuit (ASIC), or other circuitry configured to perform various input/output, control, analysis, and other functions described herein. Utility carrier(s) 714 are operated in accordance with a known standard or protocol that enables command and control signals (and other utilities) to be distributed from control module 712 to the articles mounted to members 730 so that the articles may be controlled from control module 712, for example, a CAN or LIN network. Alternatively, utilities (e.g., audio, command signals, control signals, etc.) may be transmitted wirelessly between control module 712 and articles (e.g., DVD player 728, Rear HVAC 722) mounted on the modular system using known wireless transmission protocol, for example, Infrared (IrDA), Bluetooth, Wireless LAN (IEEE 802.11) or 900 MHz FHSS. Accordingly, an article mounted to the modular system may be configured to communicate wirelessly with control module 712.

Various articles (e.g., XM radio 724, a navigation system, etc.) mounted in the vehicle, such as on a modular system, may include a display for providing display information. However, if the article is mounted in the rear of the vehicle, the display information would not be visible to the driver of the vehicle.

Accordingly, control module 712 may be configured to receive display information from an article and provide such display information on a display of the control module user interface (as shown in FIG. 9). Alternatively, the display information may be provided to another display in a viewable location in the front of the vehicle. Control module 712 may also be configured to provide other features, for example, an audio muting feature that allows an operator to mute the system audio (e.g., over the vehicle speakers or headphones) or a synchronization feature that provides synchronization between audio and video channels.

Figure 10:
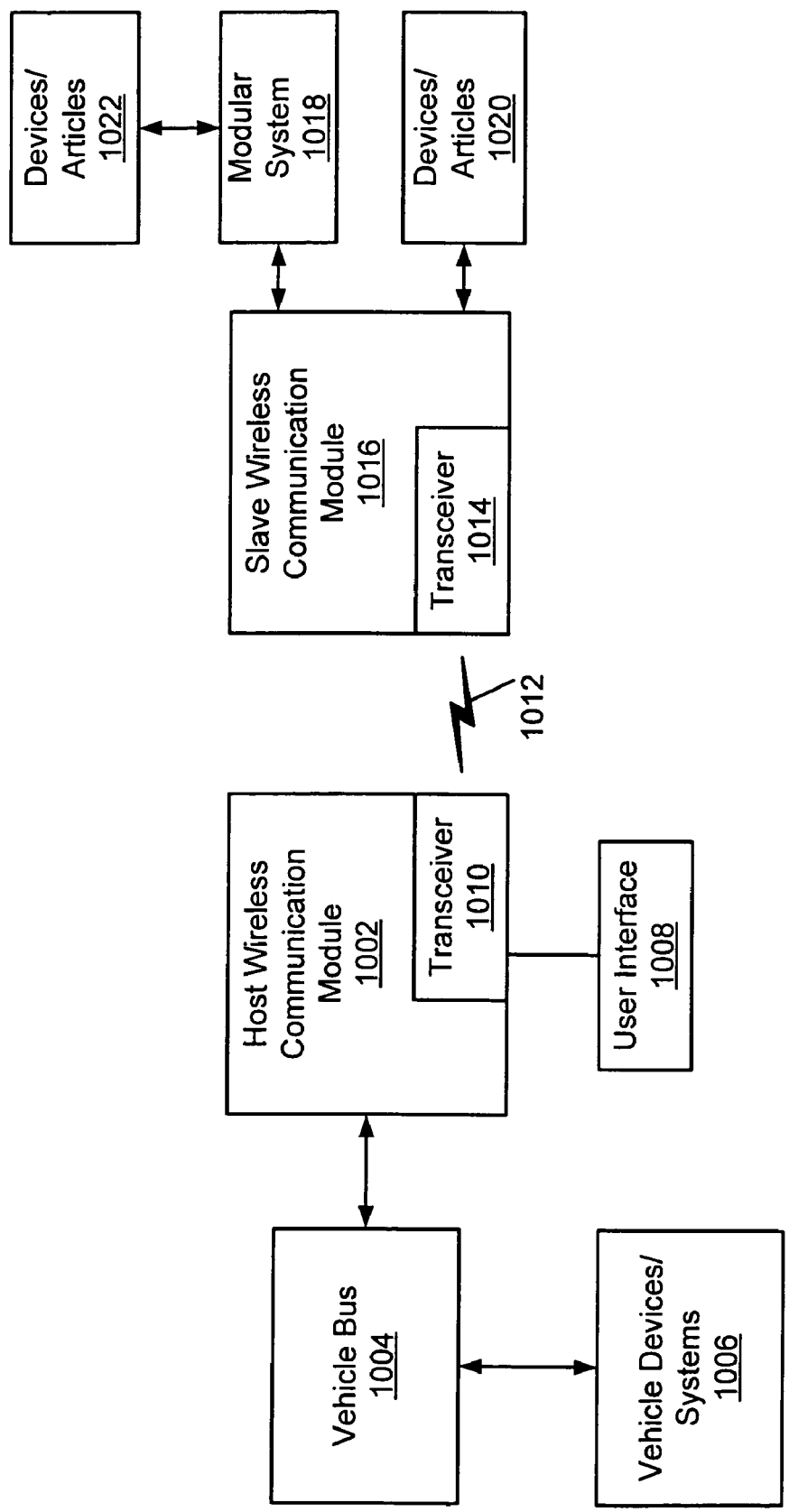
FIG. 10 is a block diagram of a wireless communication system for electrical devices in a vehicle in accordance with an embodiment.

Another system for providing wireless communication of data, audio, video and/or command and control signals between electrical devices in a vehicle is shown in FIG. 10 which shows a block diagram of a wireless electrical connectivity system in accordance with an embodiment. In FIG. 10, a host wireless communications module 1002 is incorporated into a vehicle, for example, in a dashboard or radio head of the vehicle. Host wireless communications module 1002 may be part of a vehicle device that is configured for wireless communication with other devices or articles inside the vehicle and/or external to the vehicle. For example, host wireless communication module 1002 may be a navigation system configured to receive navigation information from a satellite system or may be a wireless communication system such as a hands-free telephone system that is configured to communicate wirelessly with a wireless phone in the vehicle. Other exemplary wireless communication systems that may be included in a vehicle are described in co-pending U.S. patent application Ser. No. 09/979,199, filed Nov. 20, 2001, entitled "Wireless Communication System and Method," herein incorporated by reference in its entirety.

Host wireless communication module 1002 includes a transceiver 1010 that is configured to transmit and receive data (e.g., audio signals, command signals, etc.). Alternatively, host wireless communications module 1002 may include a separate transmitter and receiver to transmit and receive signals, respectively. Transceiver 1010 may be configured to communicate using a known wireless communications standard for transmission of data, audio, command and control signals, for example, Infrared (IrDA), Bluetooth, wireless LAN (IEEE 802.11), or 900 MHz FHSS (frequency hopping spread spectrum). Host wireless communications module 1002 is also coupled to a utility carrier 1004 (e.g., an audio bus, a vehicle bus, etc.) and other devices 1006 (e.g., an audio system, etc.) in the vehicle via utility carrier 1004. Accordingly, host wireless communications module 1002 is configured to transmit and/or receive data, audio, video and/or command and control signals to and/or from the other devices 1006 in the vehicle via the utility carrier 1004.

A slave wireless communications module 1016 is located elsewhere in the vehicle and remotely from host wireless communication module 1002, for example, slave wireless communication module 1016 may be mounted on a modular system 1018 in the vehicle or may be integrated into another device or article in the vehicle. Slave wireless communication module 1016 is configured to communicate bi-directional data, audio, video and/or command and control signals to host wireless communication module 1002. A transceiver 1014 is included in slave wireless communication module 1016 and is configured to transmit and receive data (e.g., audio signals, command signals, etc.). Alternatively, slave wireless communications modules 1112 may include a separate transmitter and receiver to transmit and receive signals, respectively. Transceiver 1014 may be configured to communicate using a known wireless communications standard for transmission of data, audio, command and control signals, for example, Infrared (IrDA), Bluetooth, wireless LAN (IEEE 802.11), 900 MHz FHSS (frequency hopping spread spectrum). Device or articles 1020 (e.g., a DVD player, a CD player, XM radio, etc.) located in the vehicle may be coupled to slave wireless communications module 1016 in order to communicate with other devices/articles in the vehicle. In other words, data may be communicated between vehicle devices/systems 1006 that are coupled to a vehicle bus and devices/articles 1020 (which are not coupled to a vehicle data bus) via the communication link 1012 between the host wireless communication module 1002 and the slave wireless communication module 1016.

Accordingly, devices or articles 1020 would not require additional wiring to communicate data signals, media signals, command signals, etc. Devices or articles 1020 may include a connection to a power source. Alternatively, slave wireless communication module 1016 may be mounted to a modular system 1018 and may be coupled to other devices/articles 1022 mounted to the modular system 1018. The system shown in FIG. 10 may reduce the wiring required to communicate data signals, media signals, command signals, etc. to devices/articles in a vehicle that are located throughout the vehicle and that may be installed either during or after vehicle assembly.

Figure 11A:
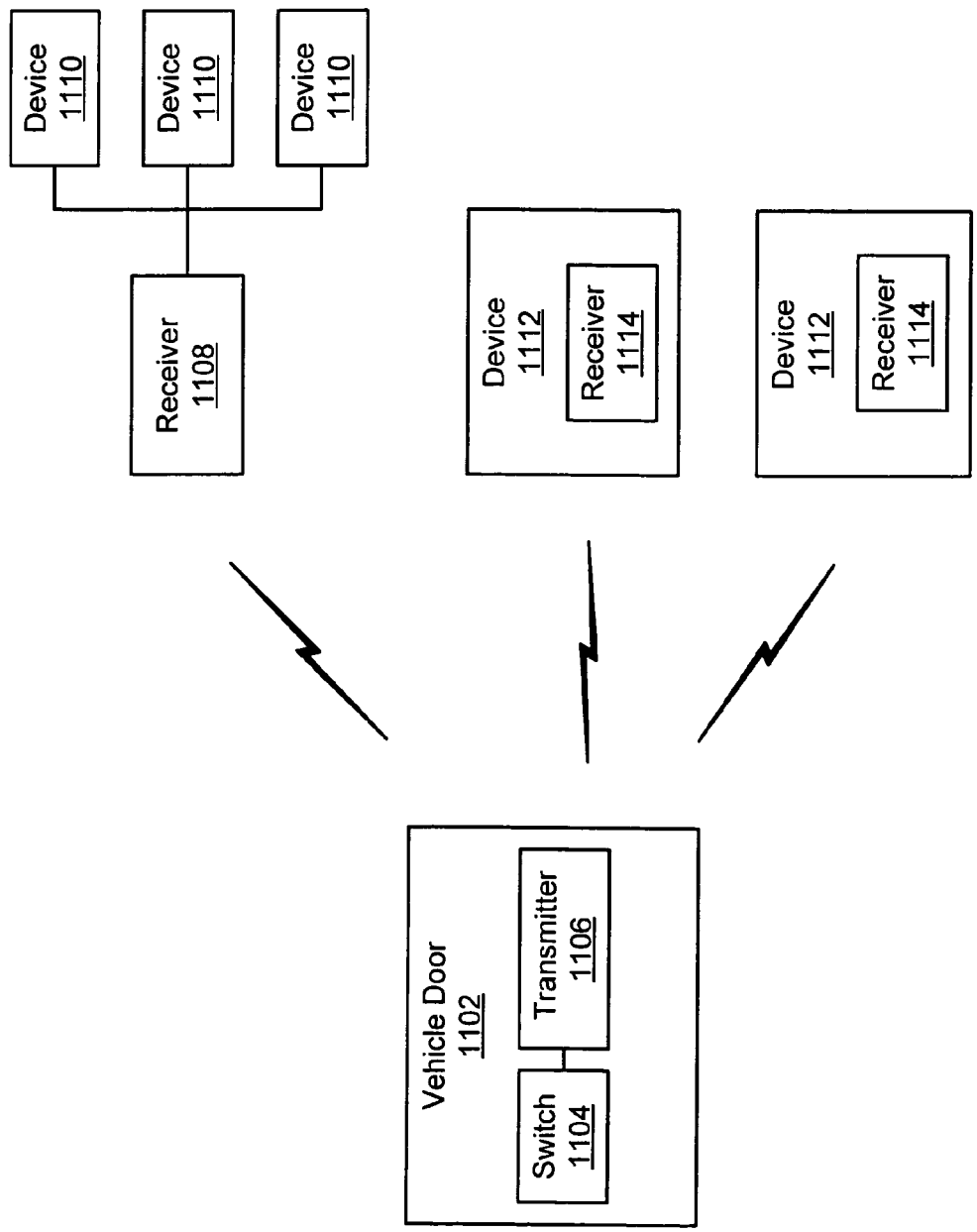
FIGS. 11A and 11B are block diagrams of a system for wireless activation of devices in a vehicle in accordance with an embodiment.
Figure 11B:
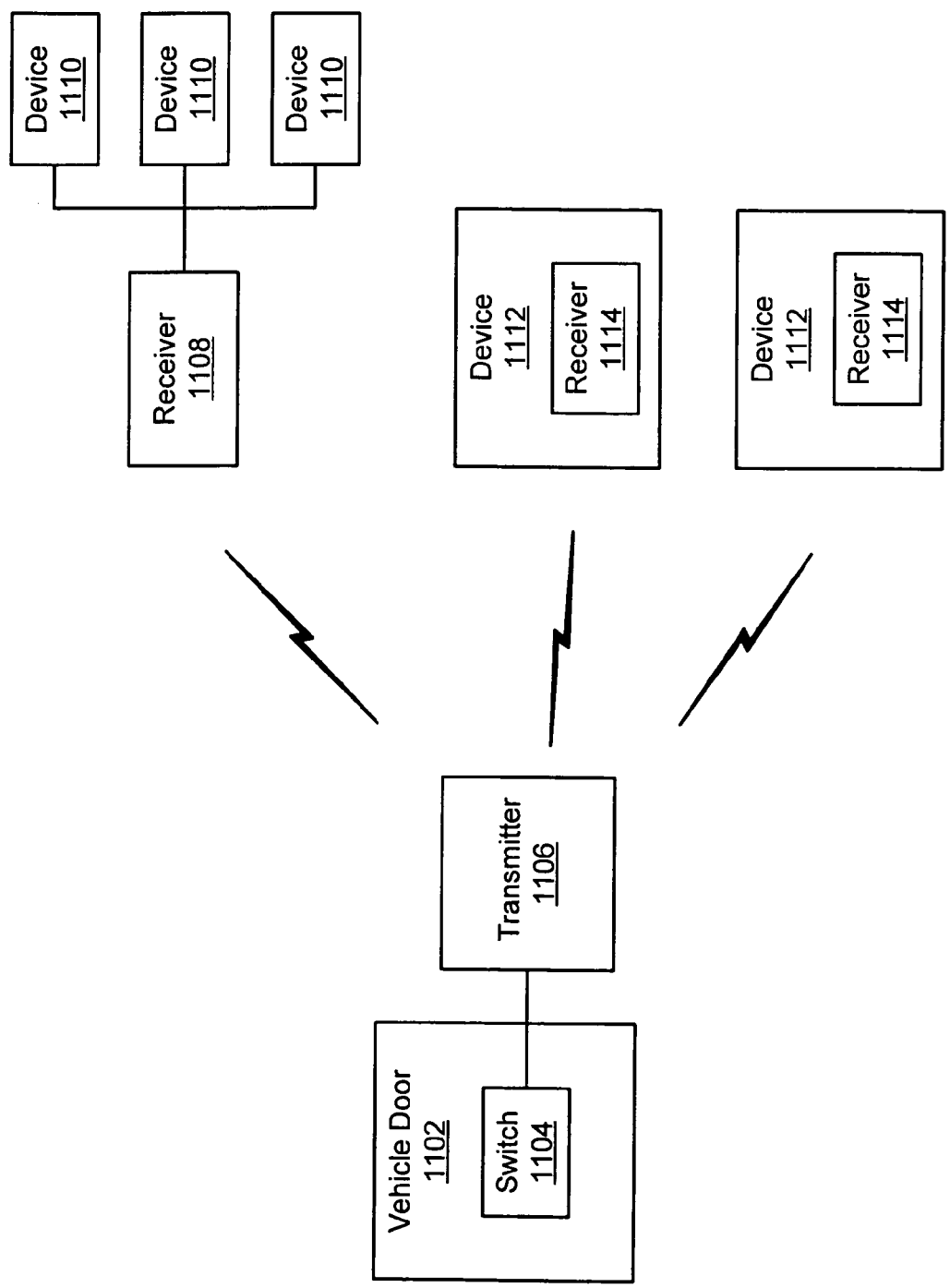

FIGS. 11A and 11B are block diagrams of a system for wireless activation of devices in a vehicle in accordance with an embodiment. Various devices or articles in a vehicle may be activated by the opening of a vehicle door such as, interior lighting (e.g., dome lamps), a dashboard display (e.g., a clock), a security system, an alarm indicating the door is open, shut down or pause functions of a DVD player, a process to determine if a set of headphones are properly docked in the vehicle, a lamp dimming cycle, special programs in the vehicle for day to day use or special use, etc. Typically, such devices are hardwired to a door switch that is responsive to the opening and closing of a vehicle door. In FIGS. 11A and 11B a wireless system is shown that may be used to activate vehicle devices in response to the opening of a vehicle door 1102. Accordingly, wiring in the vehicle may be reduced.

Referring to FIG. 11A, a vehicle door 1102 includes a switch 1104 that is configured to activate a transmitter 1106 in vehicle door 1102 in response to the opening of vehicle door 1102. In an alternative embodiment, shown in FIG. 11B, transmitter 1106 is coupled to the switch 1104 but is not located within the vehicle door 1102 but elsewhere in the vehicle. Returning to FIG. 11A, transmitter 1106 is configured to generate and transmit an activation or control signal to a device (or devices) 1110, 1112 located elsewhere in the vehicle. The control signal may be, for example, a radio frequency (RF) or infrared (IR) signal. The control signal activates the device in the vehicle such as interior lighting (e.g., dome lamps), a dashboard display (e.g., a clock), a security system, an alarm indicating the door is open, shut down or pause functions of a DVD player, a process to determine if a set of headphones are properly docked in the vehicle, a lamp dimming cycle, special programs in the vehicle for day to day use or special use, etc. In one embodiment, the device 1112 that is activated includes a receiver 1114 configured to receive the control signal from transmitter 1106. Device 1112 may be, for example, mounted to a modular system in the vehicle. In an alternative embodiment, a receiver 1108 may be provided separately from device 1110 in the vehicle. For example, a slave wireless communication module 1016 as described above with respect to FIG. 10 or a control module 712, 812 as described above with respect to FIGS. 7 and 8 may be utilized as a receiver for the control signal. Alternatively, receiver 1108 may be a stand alone device installed in the vehicle. Devices 1110 are coupled to receiver 1108 in order to receive an activation or control signal.

It is important to note that the construction and arrangement of the wireless electrical connectivity system and modular system for a vehicle provided herein is illustrative only. Although only a few embodiments of the present invention have been described in detail in this disclosure, those skilled in the art who review this disclosure will readily appreciate that many modifications are possible (e.g., variations in sizes, dimensions, structures, shapes and proportions of the various elements, values of parameters, mounting arrangements, materials, colors, orientations, etc.) without materially departing from the novel teachings and advantages of the subject matter recited herein. Accordingly, all such modifications are intended to be included within the scope of the present invention as described herein. The order or sequence of any processes or method steps may be varied or re-sequenced according to alternative embodiments. Other substitutions, modifications, changes and/or omissions may be made in the design, operating conditions and arrangement of the preferred and other exemplary embodiments without departing from the exemplary embodiments of the present invention as expressed herein.

We claim:

1. A control system for operatively connecting a plurality of devices in a vehicle to an audio system in the vehicle, the control system comprising:

a modular system configured for coupling to the vehicle configured to physically connect to the plurality of devices and including a utility carrier configured to be electrically coupled to the plurality of devices, wherein the removal of one or the plurality of devices from the utility carrier does not render the remaining devices unusable;

a control module electrically connected to the utility carrier and configured to send signals to and to receive signals from the utility carrier via the electrical connection; and a transceiver electrically coupled to the control module;

wherein the control module is configured to distribute control signals to the plurality of devices via the utility carrier and to select one of the devices for operation;

wherein the control module is further configured to receive audio signals from the selected device via the utility carrier and to transmit the audio signals to the audio system in the vehicle by providing the audio signals to the transceiver for wireless transmission to the audio system via the transceiver.

2. The control system of claim 1, wherein the transceiver is further configured to communicate with one or more source devices not electrically coupled to the audio system or the utility carrier and to receive audio signals from the one or more source devices and to provide the audio signals to the control module and wherein the control module is further configured to select one of the one or more source devices and to provide the audio signals from the selected source devices to the audio system via the transceiver.

3. The control system of claim 2, wherein one or more source devices not electrically coupled to the audio system or the modular system include at least one of a video game system, a portable audio player, and a digital video source.

4. The control system of claim 1, wherein the selection activity of the control module is commanded by a host module electrically coupled to the audio system, wherein the control module receives selection commands from the host module via the transceiver.

5. The control system of claim 1, wherein the transceiver is configured to wirelessly communicate using a Bluetooth communications protocol or an IEEE 802.11 protocol.

6. The control system of claim 1, wherein the transceiver is further configured to broadcast the audio signals to wireless headphones in the vehicle.

7. The control system of claim 1, wherein the transceiver is configured to broadcast a plurality of audio signals from more than one of the plurality of devices to wireless headphones in the vehicle and/or the audio system.

8. A modular system for operatively connected a plurality of devices in a vehicle to an audio system in the vehicle, the modular system comprising:

at least one mounting member for interchangeably connecting the plurality of devices to a utility carrier simultaneously, the mounting member configured for coupling to the vehicle, wherein at least one mounting member is configured to provide electrical power to the plurality of devices simultaneously, wherein the removal of one of the plurality of devices from the utility carrier does not render the remaining devices unusable;

a control module electrically coupled to the utility carrier; and a transceiver electrically coupled to the control module;

wherein the control module is configured to distribute control signal to the plurality of devices via the utility carrier and to select one of the devices for operation;

wherein the control module is further configured to receive audio signals from the selected device via the utility carrier and to transmit the audio signals to the audio system by providing the audio signals to the transceiver for wireless transmission to the audio system via the transceiver.

9. The modular system of claim 8, wherein the at least one mounting members comprise at least one of a rail, track, channel, holder, bar, rod, and a pole.

10. The modular system of claim 8, wherein the at least one mounting member is configured for mounting to a ceiling of the vehicle.

11. The modular system of claim 8, wherein the at least one mounting member includes an integral slide having a recess forming an outwardly projecting ledge for mounting the plurality of devices.

12. The modular system of claim 8, wherein the at least one mounting member comprises two parallel mounting members.

13. The modular system of claim 8, wherein the transceiver is further configured to communicate with one or more source devices not electrically coupled to the audio system or the utility carrier and to receive audio signals from the one or more source devices and to provide the audio signals to the control module and wherein the control module is further configured to select one of the one or more source devices and to provide the audio signals from the selected source devices to the audio system via the transceiver.

14. The modular system of claim 13, wherein the one or more source devices not electrically coupled to the audio system or the modular system include at least one of a video game system, a portable audio player, and a digital video source.

15. The modular system of claim 8, wherein the selection activity of the control module is commanded by a host module electrically coupled to the audio system, wherein the control module receives selection commands from the host module via the transceiver.

16. The modular system of claim 8, wherein the transceiver is configured to wirelessly communicate using a Bluetooth communications protocol or an IEEE 802.11 protocol.

17. The modular system of claim 8, wherein the transceiver is configured to broadcast the audio signals to wireless headphones in the vehicle.

18. The modular system of claim 8, wherein the transceiver is configured to broadcast a plurality of audio signals from more than one of the plurality of devices to wireless headphones in the vehicle and/or the audio system.

* * * * *